United States Patent
Hao et al.

(10) Patent No.: US 9,976,223 B2
(45) Date of Patent: May 22, 2018

(54) NICKEL AND/OR CHROMIUM PLATED MEMBER AND METHOD FOR MANUFACTURING THE SAME

(71) Applicant: JIAXING MINHUI AUTOMOTIVE PARTS CO., LTD., Jiaxing, Zhejiang Province (CN)

(72) Inventors: Jingjun Hao, Jiaxing (CN); Liming Qian, Jiaxing (CN)

(73) Assignee: JIAXING MINHUI AUTOMOTIVE PARTS CO., LTD., Jiaxing (CN)

( * ) Notice: Subject to any disclaimer, the term of this patent is extended or adjusted under 35 U.S.C. 154(b) by 192 days.

(21) Appl. No.: 14/737,102

(22) Filed: Jun. 11, 2015

(65) Prior Publication Data

US 2016/0265131 A1    Sep. 15, 2016

(30) Foreign Application Priority Data

Mar. 11, 2015  (CN) .......................... 2015 1 0106067

(51) Int. Cl.
| | |
|---|---|
| *B32B 15/01* | (2006.01) |
| *C25D 5/14* | (2006.01) |
| *C25D 3/12* | (2006.01) |
| *C25D 3/38* | (2006.01) |
| *C25D 5/48* | (2006.01) |

(52) U.S. Cl.
CPC .............. *C25D 5/14* (2013.01); *B32B 15/01* (2013.01); *C25D 3/12* (2013.01); *C25D 3/38* (2013.01); *C25D 5/48* (2013.01)

(58) Field of Classification Search
CPC ... C25D 5/14; C25D 3/12; C25D 3/38; C25D 5/48; B32B 15/01
See application file for complete search history.

(56) References Cited

U.S. PATENT DOCUMENTS

| | | | |
|---|---|---|---|
| 2012/0052319 A1* | 3/2012 | Sugawara et al. .... | C23C 28/322 428/613 |
| 2013/0299356 A1* | 11/2013 | Lee .......................... | C25D 5/40 205/184 |
| 2014/0284218 A1* | 9/2014 | Sugawara et al. ........ | C25D 3/06 205/179 |

FOREIGN PATENT DOCUMENTS

| | | |
|---|---|---|
| CN | 101705508 A | 5/2010 |
| CN | 101988211 A | 3/2011 |

OTHER PUBLICATIONS

Semi-Bright Nickel Guide MacDermid Industrial Solutions trade sheet, © 2005. Taken from the World Wide Web: http://industrial.macdermid.com/documents/resources/Semi%20Bright%20Nickel%20Guide.pdf.*

* cited by examiner

*Primary Examiner* — Nathan M Nutter
(74) *Attorney, Agent, or Firm* — NK Patent Law, PLLC

(57) ABSTRACT

The present invention provides a nickel and/or chromium plated member comprising a substrate, a pretreatment plating layer deposited over the whole substrate on which a copper plating layer is formed, a functional layer formed on the copper plating layer in which the functional layer has a low potential nickel layer and a microporous nickel layer formed on the low potential nickel layer, and a decorative layer formed on the microporous nickel layer. In this invention, the microporous nickel layer and the low potential nickel layer provided on the surface of the member significantly improve the corrosion resistance and stability of the whole member and provide good brightness uniformity and binding effect of the plating layers.

3 Claims, 5 Drawing Sheets

NICKEL AND/OR CHROMIUM PLATED MEMBER AND METHOD FOR MANUFACTURING THE SAME

BACKGROUND OF THE INVENTION

Field of Invention

The present invention relates to a work piece having an electroplating layer on its surface and a method for manufacturing the same, in particular, to a nickel and/or chromium plated member or a method for manufacturing the same.

Related Art

The environmentally friendly requirements are stricter and stricter in the European market and the demands of corrosion resistance for electroplating in main engine plants are higher and higher. At present trivalent chromium electroplating could not meet the corrosion requirements for some special environment, that is to say, could not be subject to the Copper-Accelerated Acetic Acid-Salt Spray Testing for 80 hours and the Russian mud resistance test for 336 hours.

The anti-corrosive capacity of a work piece could be improved by plating two or three layers of nickel and then plating chromium in the electroplating industry. The widely applied two-layer nickel plating process includes plating Semi-bright nickel, bright nickel, and crack-free chromium. The widely applied three-layer nickel plating process includes plating Semi-bright nickel, bright nickel, microporous nickel, and crack-free chromium or plating Semi-bright nickel, bright nickel, micro-crack nickel, and crack-free chromium. However, as the stress of the chromium layer itself is large, it is difficult to obtain a chromium plating layer without any cracks or pores in the industry, including a hexavalent chromium and a trivalent chromium plating layer. When the chromium plating layer exposed to the air is passivated, its potential is more positive than that of nickel. And the chromium plating layer will form a corrosion cell with the nickel layer when it encounters the corrosion medium. Consequently, the decorative nickel plating layer will be irregularly corroded to a large extent in extreme environments, and the chromium player may fall off due to large-area corrosion of the nickel layer. In order to further improve the anti-corrosive capacity of the nickel layer, microporous nickel and micro-crack nickel are applied to the bright nickel plating layer. A special high stress nickel layer is plated on the bright nickel layer by using micro-crack nickel and a large number of micro-cracks will be generated by the stress after chromium is plated. The microporous nickel layer diverges the corrosion current in the multi-layer nickel to prevent forming corrosion points in depth and avoid, visible corrosion. As the micro-crack nickel layer is separately used, the fog will be produced on the surface of the product, the brightness thereof is poor, and the trivalent chromium plating is not involved. Additionally, the microporous nickel or micro-crack nickel is separately used, resulting in a limited improvement in anti-corrosive capacity. Moreover, it is disclosed in a part of the prior art that the feature for noble potential is achieved by altering the microporous nickel process to meet the requirement for anti-corrosive performance of trivalent chromium. However, the noble potential microporous nickel could not be matched well with hexavalent chromium to satisfy anti-corrosive demands.

In the prior art, for example in Chinese Patent Publication No. 101988211, multi-layer nickel plating process for metal surface having a good anti-corrosive feature is disclosed. The plating process includes (A) to metalize the surface of to plastic piece, (B) to plate bright copper, (C) to plate Semi-bright nickel, (D) to plate high sulfur nickel, (E) to plate bright nickel, (F) to plate microporous nickel, (G) to wash by water, (H) to plate bright chromium, (I) to wash by water, and (J) to dry. Even though the anti-corrosive performance of the plastic piece is enhanced slightly by using four layers of nickel-nickel electroplating solution for plating on the surface of the plastic, the anti-corrosive capacity of the said process could still not meet the requirement for corrosion environment containing deicing salt ($CaCl_2$). Fog could be formed partly on the high sulfur nickel electroplating layer. Moreover, the plastic surface treatment is not adequate in this process, bringing poor deep plating capacity to the plating layer and causing the plating layer easily crisp. The plastic subject to electroplating treatment has a short use life as members for vehicles, for example grills, decorative bars and door handles. The introduction to the process for micro-crack nickel is made in Chinese Patent Publication No. 101705508A, which discloses electroplating solution for micro-crack nickel plating and its application. The main components of the micro-crack nickel electroplating solution include 180~260 g/L of nickel chloride, 20~60 ml/L of acetic acid, 80~120 ml/L of ELPELYT MR and 1~5 ml/L of 62 A. The description of embodiments of the patent document is limited to hexavalent chromium plating and trivalent chromium plating is not mentioned therein.

SUMMARY OF THE INVENTION

In order to address the aforesaid challenges, the present invention provides a nickel and/or chromium plated member which significantly improves the corrosion resistance and stability of the whole member by placing a microporous nickel layer and a low potential nickel layer on the surface of the member. Meanwhile, the nickel and/or chromium plated member has good brightness and uniformity. The plating layers are combined in a good way so that the member not only guarantees the bright feature of appearance of the microporous nickel layer, but also has dual corrosion resistance of the functional layer containing microporous nickel. Thereby, the member has high corrosion resistance and structural stability.

The nickel plated member of the invention comprises:
a substrate;
a pretreatment plating layer deposited over the whole substrate, on which a copper plating layer is formed; and
a functional layer formed on the copper plating layer, in which the functional layer has a low potential nickel layer and a microporous nickel layer formed on the low potential nickel layer.

In a preferred embodiment, the potential difference between the microporous nickel layer and the low potential nickel layer is in the range of 10-120 mv.

In a preferred embodiment, the low potential nickel layer includes one of a high sulfur nickel layer and a micro-crack nickel layer or a complex plating layer of the high sulfur nickel layer with the micro-crack nickel layer.

In a preferred embodiment, the potential difference between the microporous nickel layer and the low potential nickel layer is in the range of 20-100 mv.

In a preferred embodiment, when the low potential nickel layer employs the complex plating layer of the micro-crack nickel layer with the high sulfur nickel layer, the potential difference between the micro-crack nickel layer and the high sulfur nickel layer is 10-80 mv. When the corrosion reaches the low potential nickel layer, as the potential of the micro-crack nickel layer is higher than that of the high sulfur nickel layer, the latter is first corroded as an anode plating layer and the corrosion of the micro-crack nickel layer is postponed, thereby timber enhancing the corrosion resistance.

The nickel-chromium plated member of the invention comprises:
  a substrate;
  a pretreatment plating layer deposited over the whole substrate, on which a copper plating layer is formed; and
  a functional layer formed on the copper plating layer, in which the functional layer has a low potential nickel layer and a microporous nickel layer formed on the low potential nickel layer; and
  a decorative layer formed on the microporous nickel layer, in which the decorative layer is a trivalent chromium plating layer or a hexavalent chromium plating layer.

In a preferred embodiment, the decorative layer is a trivalent chromium plating layer, and the trivalent chromium plating layer is a trivalent black chromium plating layer or a trivalent white chromium plating layer or other types of trivalent chromium.

The nickel-chromium plated member of the invention comprises:
  a substrate;
  a pretreatment plating layer deposited over the whole substrate, on which a copper plating layer is formed, and
  a basic layer formed on the copper plating layer; and
  a functional layer formed on the basic layer, in which the functional layer has a low potential nickel layer and a microporous nickel layer formed on the low potential nickel layer; and
  a decorative layer formed on the microporous nickel layer, in which the decorative layer is a trivalent chromium plating layer or a hexavalent chromium plating layer.

In a preferred embodiment, the basic layer includes one or more Semi-bright nickel layer, a high sulfur nickel layer, a bright nickel layer and a Satin nickel layer.

In a preferred embodiment, the basic layer is a complex of the Semi-bright nickel layer with the bright nickel layer or Satin nickel layer, in which the Semi-bright nickel layer is formed on the copper plating layer and the bright nickel layer or Satin nickel layer is formed on the Semi-bright nickel layer.

In a preferred embodiment, the basic layer is a complex of the Semi-bright nickel layer, the high sulfur nickel layer with the bright nickel layer, in which the Semi-bright nickel layer is formed on the copper plating layer, the high sulfur nickel layer is formed on the Semi-bright nickel layer and the bright nickel layer is formed on the high sulfur nickel layer.

In a preferred embodiment, the basic layer is a complex of the Semi-bright nickel layer, the high sulfur nickel layer with the Satin nickel layer, in which the Semi-bright nickel Semi-bright nickel layer is formed on the copper plating layer, the high sulfur nickel layer is formed on the Semi-bright nickel layer and the Satin nickel layer is formed on the high sulfur nickel layer.

In a preferred embodiment, the basic layer is a complex of the Semi-bright nickel layer, the bright nickel layer with the Satin nickel layer, in which the Semi-bright nickel layer is formed on the copper plating layer, the bright nickel layer is formed on the Semi-bright nickel layer and the Satin nickel layer is formed on the bright nickel layer.

In a preferred embodiment, the potential difference between any one of the bright nickel layer and the Satin nickel layer and the low potential nickel layer is in the range of 0-100 mv.

In a preferred embodiment, the potential difference between the Semi-bright nickel layer and the bright nickel layer and the potential difference between the Semi-bright nickel layer and the Satin nickel layer are both in the range of 100-200 mv.

The method for manufacturing a nickel-Chromium plated member of the invention comprises:
  pretreating a surface of a substrate;
  depositing a pretreatment plating layer over the whole substrate and forming a copper plating layer on the pretreatment plating layer; and
  forming, a basic layer on the copper plating layer; and
  forming a functional layer on the basic layer; and
  forming a decorative layer on the functional layer;
  wherein, the basic layer is a complex of a Semi-bright nickel layer with a bright nickel layer or a complex of a Semi-bright nickel layer with a Satin nickel layer, in which the Semi-bright nickel layer is formed on the copper plating layer and the bright nickel layer or Satin nickel layer is formed on the Semi-bright nickel layer;
  the functional layer is a complex of a low potential nickel layer with a microporous nickel layer, in which the low potential nickel layer is formed on the bright nickel layer or Satin nickel layer, the microporous nickel layer is formed on the low potential nickel layer, and the potential difference between the microporous nickel layer and the low potential nickel layer is 10-120 mv; and
  the decorative layer is formed on the microporous nickel layer.

The potential difference is controlled to be within such a range that bubbling does not tend to occur in the process of plating. In the meantime, the plaiting layer has a reliable and firm structure and will not easily fall off. Here the low potential nickel layer cooperates with the copper plating layer to directly plate the low potential layer onto the copper plating layer without any other plating layer doped therebetween.

In all the solutions of the present invention, the thickness of the microporous nickel layer is no less than 1.5 µm, the thickness of the micro-crack nickel layer is no less than 1.0 µm, the thickness of the high sulfur nickel layer is no less than 1.0 µm, the thickness of the Semi-bright nickel plating layer is no less than 8 µm, and the thickness of the bright nickel plating layer is no less than 5 µm. When the trivalent chromium plating, layer is used as the decorative layer, a passivation film could be formed thereon.

In a first aspect of the invention, a nickel plated member is provided, comprising a substrate, a pretreatment plating layer (which could include one of a chemical nickel layer and a basic nickel layer or a composite of the chemical nickel layer with the basic nickel layer depending on the material of the substrate) formed on the whole substrate; a copper plating layer formed on the pretreatment plating layer; a functional layer formed on the copper plating layer, in which the functional layer has a low potential nickel layer and a microporous nickel layer formed on the low potential nickel layer, and the low potential nickel layer of the functional layer is formed on the copper plating layer; a basic layer could be further formed between the copper plating layer and the function layer, in which the basic layer is formed on the copper plating layer and the functional layer is formed on the basic layer; the microporous nickel layer of the functional layer is formed on the low potential nickel layer; and the potential difference between the microporous nickel layer and the low potential nickel layer is in the range of 0-120 mv.

The functional layer could be plated with a decorative layer depending on the requirement for appearance and other product requirements, in which the decorative layer is a chromium plating layer which is a trivalent white chromium plating layer or a trivalent black chromium plating layer or any one of other forms of trivalent or hexavalent chromium plating layers. The decorative is formed on the microporous nickel plating layer of the functional layer and could have any one of a microporous configuration and a micro-crack configuration.

In a second aspect of the invention, the method for manufacturing a nickel plated member of the invention comprises pretreating a surface of a substrate (in which the pretreatment is selectively conducted in accordance with the material of the substrate, including pretreatment to metal substrates and that to non-metal substrates including ABS); depositing a pretreatment plating layer over the whole substrate and forming a copper plating layer on the pretreatment plating layer; forming a low potential nickel layer of a functional layer on the copper plating layer; forming a microporous nickel layer of the functional layer on the low potential nickel layer; and forming a decorative layer on the functional layer.

According to one improvement to the method for manufacturing the nickel plated member of the invention, the low potential nickel layer includes one of a high sulfur nickel layer, a micro-crack nickel layer, and a composite of the high sulfur nickel layer and the micro-crack nickel layer.

Chemical nickel deposition refers to the deposition of a thin film of conductive layer on the metal palladium of the surface of the substrate with catalytic activity, to facilitate subsequent electroplating of various metals.

When both the chemical nickel layer and the basic nickel layer are present on the substrate, a thin film of conductive layer has been formed on the surface of the substrate by redox reaction in the process of chemical nickel deposition. And while the basic nickel is being plated, a layer of nickel is plated on the chemical nickel by using electrochemistry to further improve conductivity of the plating layer.

The copper plating layer is aimed at improving the brightness and flatness of the surface of the substrate by using the feature of copper sulphate and further improving the holistic toughness of the plating layer. The copper plating layer has a better extensibility than the nickel and other metal plating layers. Consequently, the toughness and flatness of the whole plating layer could be improved after the copper sulphate layer is plated.

The Semi-bright nickel plating layer is aimed at plating a layer of Semi-bright nickel on the surface of the substrate. The Semi-bright nickel plating layer is of a column configuration to improve the corrosion resistance of the plating layer.

The bright nickel plating layer is aimed at plating a layer of bright nickel on the surface of the substrate. The bright nickel plating layer is of a layer configuration to improve the brightness of the plating layer.

The micro-crack nickel plating layer refers to an even plating layer having numberless cracks formed on the surface of the substrate which could diverge the corrosion current and reduce density of the corrosion current. The microporous nickel plating layer refers to an even plating layer having numberless nonconductive particles formed on the surface of the substrate, which could further diverge the corrosion current, reduce the density of the corrosion current and fully enhance the corrosion resistance of the plating layer.

In the steps of chemical nickel deposition and basic nickel plating, the pre-plated nickel plating layer has an auxiliary function, in which the boric acid is not only a stabilizer and also a blackening agent of the electroplating liquid, which could improve the covering and deep plating capacities of the electroplating liquid and enhance the compactness of the plating layer.

The anti-corrosive effect could be achieved in the invention when the low potential plating layer employs a single micro-crack nickel layer or a composite nickel layer of the high sulfur nickel layer with the micro-crack nickel layer. The micro-crack nickel layer or microporous nickel layer of the functional layer or the combination of the micro-crack nickel layer with the microporous nickel layer could have an anti-corrosive effect and protect the substrate in that a corrosion cell is easily formed by the plating layer metal/substrate metal on the work piece. When the potentials of the cathode and anode are determined, the corrosion rate is controlled by the ratio of the exposed area of the plating layer metal (cathode) to that of the substrate metal (anode). When only one corrosion point exists, the cathode/anode ratio is the largest and the corrosion current is concentrated at this point. The corrosion rate becomes high and pitting corrosion could be formed inward. When a number of potential corrosion points exist on the surface of the metal plating layer, the cathode/anode ratio is low and the corrosion current is distributed homogenously. The current on the original corrosion points is obviously reduced and the corrosion rate is largely decreased. Meanwhile, the separation among the micropores or cracks forms a discontinuous cathode of plating layer, and the plating layer becomes from a large to a small area after separation, which further limits the cathode/anode ratio. As time goes, when large cracks are formed on the surface of the plating layer due to circumstantial factors, the potential corrosion cell of micro-crack and microporous configuration will be induced to protect the corrosion points. To this end, the density of the corrosion current could be reduced in two ways and the corrosion resistance is significantly improved.

The low potential nickel anti-corrosive principle is described as follows.

In the first step, when the corrosion medium is removed from the surface of the member, the corrosion will be led to spread at the nickel layer at the micropores as a highly anti-corrosive passivation layer exists on the decorative layer for example chromium layer) and micropores are existing on the surface of the chromium layer. The corrosion will be divided into a number of areas because of discontinuity of the micropores, while the total corrosion amount is kept unchanged. Therefore, corrosion takes place without affecting the appearance.

In the second step, when corrosion reaches the low potential nickel layer, the low potential nickel is first corroded as an anodic plating layer (that is to say, the low potential nickel layer is preferably a sacrifice layer) and corrosion in the microporous nickel is terminated, as the potential of the microporous nickel is higher than that of the low potential nickel. Corrosion is led by a large number of discontinuous micro-cracks to spread in the vertical and transverse directions of cracks simultaneously. The corroded area of the nickel layer will be largely increased and discontinuous. These micropores greatly diverge the corrosion current when the corrosion current is determinate, which further decreases the corrosion rate of a single point and deters the corrosion rate. In the meantime, the chromium layer and the attachment microporous nickel layer on the appearance surface are protected to further improve the corrosion resistance of the surface of the product.

In the third step, when corrosion further extends downward in the low potential nickel layer, the low potential nickel is used as an anodic plating layer as the potential of the plating layer (e.g. copper plating layer) below the low potential nickel layer is higher than that of the low potential nickel. At this point, the downward corrosion is terminated and corrosion takes place in the transverse direction in the low potential nickel, which further defers the timing for the substrate to be corroded and largely reduces the corrosion rate.

The present invention has the following advantages over the prior art.

First, in this invention, after the substrate is subject to pretreatment, good preparation has been set up for subsequently plating the low potential nickel layer and the microporous nickel layer, which provides a stable process and reasonable cooperation.

Second, the microporous nickel layer and the low potential nickel layer obtained by plating on the surface of the substrate in the invention have advantages such as high corrosion resistance, high hardness, high abrasion resistance, a high binding force between the plating layers and high brightness. The microporous nickel layer having a high potential and the low potential nickel layer which has a multiple layers of nickel having a low potential, are used as the functional layer, and the low potential nickel layer is the sacrifice layer. The microporous nickel layer having a microporous structure could diverge electrochemical corrosion micro-current, deter occurrence of corrosion and provide a support to the low potential nickel layer as the sacrifice layer by oxidizing the microporous structure to form an oxide after the low potential nickel layer is seriously corroded, which reduces the destruction rate of the plating layer of the member. The low potential nickel layer used as the sacrifice layer has such a lower potential that it will be first corroded when the plating layer on the surface of the member is subject to electrochemical corrosion, and when the microporous nickel layer or micro-crack nickel layer exists, the micropores or micro-cracks could diverge the corrosion micro-current as well. When an outer layer, for example a decorative layer or protective layer, is further provided outside of the low potential nickel layer, the micropores or micro-cracks could provide a support to the outer layer, thereby improving the firmness in terms of the material structure. Moreover, the invention makes use of the pore structure of the microporous nickel and micro-crack nickel, which could enhance the supporting performance of material structure and reduce the mass of the plating layers as well as the cost consumption. Meanwhile, the microporous structure could form a thin film of oxide of a large area when oxidation and corrosion take place, which greatly defers occurrence of corrosion.

Third, the electroplating liquid that has little impact to environment is employed by the invention, which provides a more environment friendly plating process. Furthermore, the plating layers are combined firmly and evenly distributed and has longer use life. As such, the final product could meet the demands of the user in terms of appearance and performance. The process of the invention thus has a high competitive force on the market.

BRIEF DESCRIPTION OF THE DRAWINGS

The present invention will become more fully understood from the detailed description given below for illustration only, and thus are not limitative of the present invention, and wherein.

DETAILED DESCRIPTION OF THE INVENTION

Embodiments of the present invention will be described in detail below with reference to the drawings. It shall be noted that these embodiments are only illustrative of the invention and do not limit the scope of the invention. The words used herein such as "front", "back", "left", "right", "on" and "below" refer to directions in the figures and the words "in" and "out" refer to orientations or directions toward or away from the geometrical center of a particular member respectively.

The configuration of the plating layer of the nickel and/or chromium plated member of the invention will be described below. In this invention the substrate could employ metals, non-metals including ABS and other members suitable for electroplating. The longitudinal coordinate axis is omitted in FIGS. 6-15. The upper or lower position of each layer of the member indicates the higher or lower potential of the said layer.

Structural Embodiment 1

Figure 1:
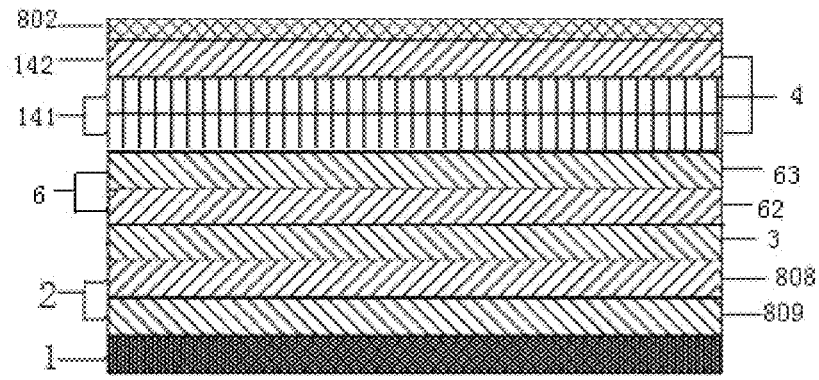
FIG. 1 is a schematic view of the structure of the nickel and/or chromium plated member of the invention according to one embodiment in which the base layer is a complex of the Semi-bright nickel layer with the bright nickel layer.

As shown in FIG. 1, the multi-layer super anti-corrosive nickel-chromium plated member according to this embodiment comprises a substrate 1 (ABS material); a pretreatment plating layer 2 having a chemical nickel layer 809, a base nickel layer 808 and a copper plating layer 3, in which the chemical nickel layer 809 is deposited over the whole substrate 1, the base nickel layer 808 is deposited over the chemical nickel layer 809 and the copper plating layer 3 is formed on the base nickel layer 808; and a basic layer 6 formed on the copper plating layer 3, in which the basic layer 6 has a Semi-bright nickel layer 62 and a bright nickel layer 63, the Semi-bright nickel layer 62 is formed on the copper plating layer 3 and the bright nickel layer 63 is formed on the Semi-bright nickel layer 62; and a functional layer 4 formed on the bright nickel layer 63 of the basic layer 6, in which the functional layer 4 has a low potential nickel layer 141 and a microporous nickel layer 142, the low potential nickel layer 141 is a high sulfur nickel layer and a micro-crack nickel layer (wherein the high sulfur nickel layer is formed on the copper plating layer 3 and the micro-crack nickel layer is formed on the high sulfur nickel layer; or the micro-crack nickel layer is formed on the copper plating layer 3 and the high sulfur nickel layer is formed on the micro-crack nickel layer), and the microporous nickel layer 142 is formed on the low potential nickel layer 141; and a decorative layer 802 formed on the microporous nickel layer 142, in which the decorative layer is a trivalent white chromium plating layer.

Figure 6:
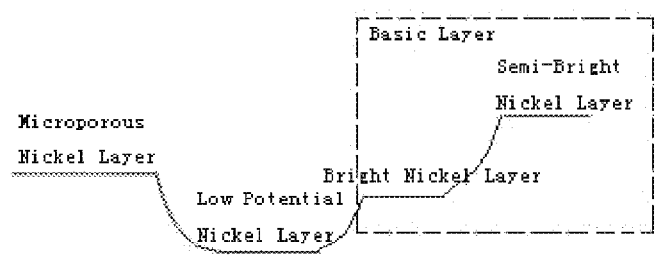
FIG. 6 is a schematic view of the potential difference of the nickel and/or chromium plated member of the invention according to one embodiment in which the low potential nickel layer is the high sulfur nickel layer or the micro-crack nickel layer and the base layer is a complex of the Semi-bright nickel layer with the bright nickel layer.
Figure 11:
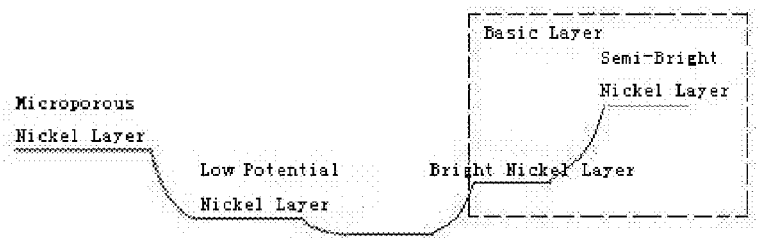
FIG. 11 is a schematic view of the potential difference of the nickel and/or chromium plated member of the invention according, to one embodiment in which the low potential nickel layer is a complex layer of the high sulfur nickel layer with the micro-crack nickel layer and the base layer is a complex of the Semi-bright nickel layer with the bright nickel layer.

It could be seen from the potential diagrams of the plating layers of FIGS. 6 and 11 that the low potential nickel layer is the sacrifice layer while being subject to corrosion no matter when the low potential nickel layer is a single layer or a composite layer in this embodiment. When the low potential nickel layer is a composite layer of the high sulfur nickel layer with the micro-crack nickel layer, the potentials of the high sulfur nickel layer and the micro-crack nickel layer will be adjusted according to actual manufacturing processes, in which the high sulfur nickel layer has a higher potential or the micro-crack nickel layer has a higher potential. The bright nickel layer will be corroded firstly in light of the electric corrosion priority to reduce damage to the structure of the surface layer when the low potential nickel layer is completely corroded.

Structural Embodiment 2

Figure 2:
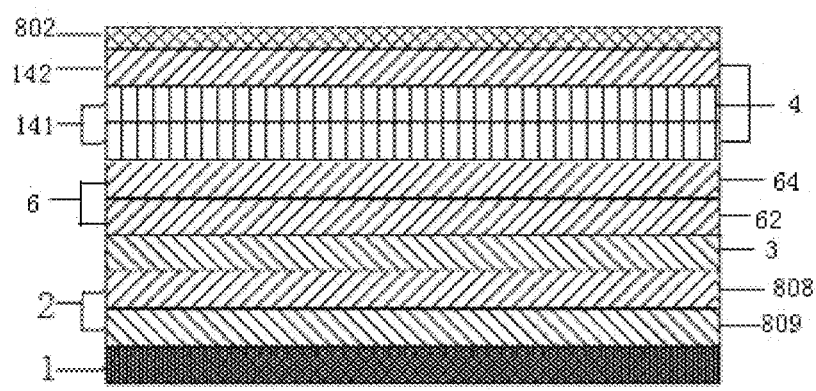
FIG. 2 is a schematic view of the structure of the nickel and/or chromium plated member of the invention according to one embodiment in which the base layer is a complex of the Semi-bright nickel layer with the Satin nickel layer.

As shown in FIG. 2, the multi-layer super anti-corrosive nickel-chromium plated member according to this embodiment comprises a substrate 1 (ABS material); a pretreatment plating layer 2 having a chemical nickel layer 809, a base nickel layer 808 and a copper plating layer 3, in which the chemical nickel layer 809 is deposited over the whole substrate 1, the base nickel layer 808 is deposited over the chemical nickel layer 809 and the copper plating layer 3 is formed on the base nickel layer 808; and a basic layer 6 formed on the copper plating, layer 3, in which the basic layer 6 has a Semi-bright nickel layer 62 and a Satin nickel layer 64, the Semi-bright nickel layer 62 is formed on the copper plating layer 3 and the Satin nickel layer 64 is formed on the Semi-bright nickel layer 62; and a functional layer 4 formed on the Satin nickel layer 64 of the basic layer 6, in which the functional layer 4 has a low potential nickel layer 141 and a microporous nickel layer 142, the low potential nickel layer 141 is a high sulfur nickel layer and a micro-crack nickel layer (wherein the high sulfur nickel layer is formed on the copper plating layer 3 and the micro-crack nickel layer is formed on the high sulfur nickel layer; or the micro-crack nickel layer is formed on the copper plating layer 3 and the high sulfur nickel layer is formed on the micro-crack nickel layer), and the microporous nickel layer 142 is formed on the low potential nickel layer 141; and a decorative layer 802 formed on the microporous nickel layer 142, in which the decorative layer is a trivalent white chromium plating layer.

Figure 7:
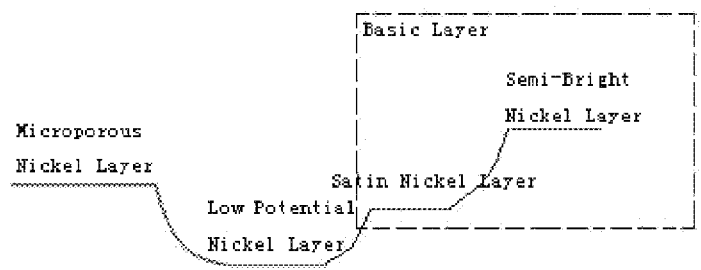
FIG. 7 is a schematic view of the potential difference of the nickel and/or chromium plated member of the invention according to one embodiment in which the low potential nickel layer is the high sulfur nickel layer or the micro-crack nickel layer and the base layer is a complex of the Semi-bright nickel layer with the Satin nickel layer.
Figure 12:
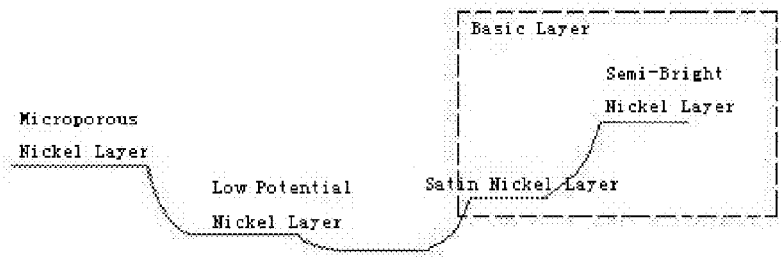
FIG. 12 is a schematic view of the potential difference of the nickel and/or chromium plated member of the invention according to one embodiment in which the low potential nickel layer is a complex layer of the high sulfur nickel layer with the micro-crack nickel layer and the base layer is a complex of the Semi-bright nickel layer with the Satin nickel layer.

It could be seen from the potential diagrams of the plating layers of FIGS. 7 and 12 that the low potential nickel layer is the sacrifice layer while being subject to corrosion no matter when the low potential nickel layer is a single layer or a composite layer in this embodiment. When the low potential nickel layer is a composite layer of the high sulfur nickel layer with the micro-crack nickel layer, the potentials of the high sulfur nickel layer and the micro-crack nickel layer will be adjusted according to actual manufacturing processes, in which the high sulfur nickel layer has a higher potential or the micro-crack nickel layer has a higher potential. The Satin nickel layer will be corroded firstly in light of the electric corrosion priority to reduce damage to the structure of the surface layer when the low potential nickel layer is completely corroded.

Structural Embodiment 3

Figure 3:
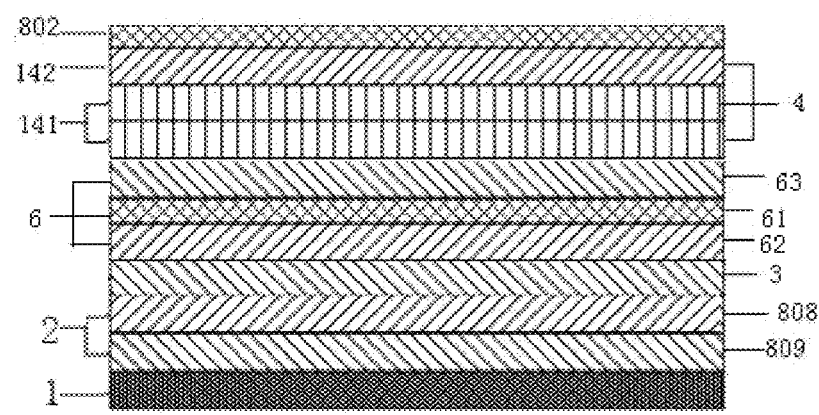
FIG. 3 is a schematic view of the structure of the nickel and/or chromium plated member of the invention according to one embodiment in which the base layer is a complex of the Semi-bright nickel layer, the high sulfur nickel layer with the bright nickel layer.

As shown in FIG. 3, the multi-layer super anti-corrosive nickel-chromium plated member according to this embodiment comprises a substrate 1 (ABS material); a pretreatment plating layer 2 having a chemical nickel layer 809, a base nickel layer 808 and a copper plating layer 3 in which the chemical nickel layer 809 is deposited over the whole substrate 1, the base nickel layer 808 is deposited over the chemical nickel 809 and the copper plating layer 3 is formed on the base nickel layer 808, and a basic layer 6 formed on the copper plating layer 3, in which the basic layer 6 has a Semi-bright nickel layer 62, a high sulfur nickel layer 61 and a bright nickel layer 63, the Semi-bright nickel layer 62 is formed on the copper plating layer 3, the high sulfur nickel layer 61 is formed on the Semi-bright nickel layer 62 and the bright nickel layer 63 is formed on the high sulfur nickel layer 61; and a functional layer 4 formed on the bright nickel layer 63 of the basic layer 6, in which the functional layer 4 has a low potential nickel layer 141 and a microporous nickel layer 142, the low potential nickel layer 141 is a high sulfur nickel layer and a micro-crack nickel layer (wherein the high sulfur nickel layer is formed on the copper plating layer 3 and the micro-crack nickel layer is formed on the high sulfur nickel layer; or the micro-crack nickel layer is formed on the copper plating layer 3 and the high sulfur nickel layer is formed on the micro-crack nickel layer), and the microporous nickel layer 142 is formed on the low potential nickel layer 141; and a decorative layer 802 formed on the microporous nickel layer 142, in which the decorative layer is a trivalent white chromium plating layer.

Figure 8:
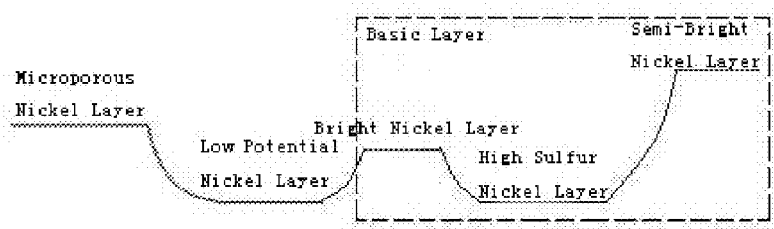
FIG. 8 is a schematic view of the potential difference of the nickel and/or chromium plated member of the invention according to one embodiment in which the low potential nickel layer is the high sulfur nickel layer or the micro-crack nickel layer and the base layer is a complex of the Semi-bright nickel layer, the high sulfur nickel layer with the bright nickel layer.
Figure 13:
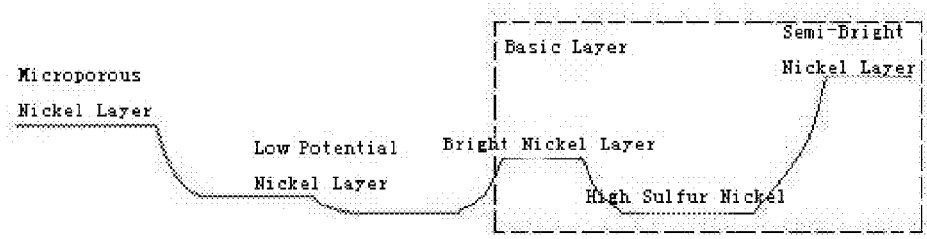
FIG. 13 is a schematic view of the potential difference of the nickel and/or chromium plated member of the invention according to one embodiment in which the low potential nickel layer is a complex layer of the high sulfur nickel layer with the micro-crack nickel layer and the base layer is a complex of the Semi-bright nickel layer, the high sulfur nickel layer with the bright nickel layer.

It could be seen from the potential diagrams of the plating layers of FIGS. 8 and 13 that the low potential nickel layer is the sacrifice layer while being subject to corrosion no matter when the low potential nickel layer is a single layer or a composite layer in this embodiment. When the low potential nickel layer is a composite layer of the high sulfur nickel layer with the micro-crack nickel layer, the potentials of the high sulfur nickel layer and the micro-crack nickel layer will be adjusted according to actual manufacturing processes, in which the high sulfur nickel layer has a higher potential or the micro-crack nickel layer has a higher potential. The bright nickel layer will be corroded firstly in light of the electric corrosion priority to reduce damage to the structure of the surface layer when the low potential nickel layer is completely corroded.

Structural Embodiment 4

Figure 4:
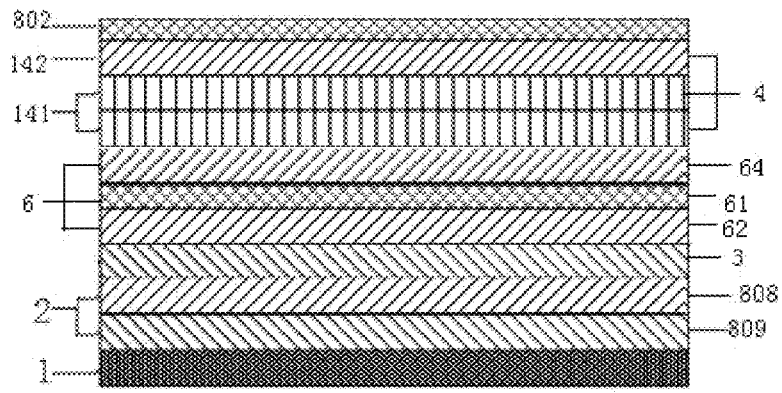
FIG. 4 is a schematic view of the structure of the nickel and/or chromium plated member of the invention according to one embodiment in which the base layer is a complex of the Semi-bright nickel layer, the high sulfur nickel layer with the Satin nickel layer.

As shown in FIG. 4, the multi-layer super anti-corrosive nickel-chromium plated member according to this embodiment comprises a substrate 1 (ABS material); a pretreatment plating layer 2 having a chemical nickel layer 809, a base nickel layer 808 and a copper plating layer 3, in which the chemical nickel layer 809 is deposited over the whole substrate 1, the base nickel layer 808 is deposited over the chemical nickel layer 809 and the copper plating layer 3 is formed on the base nickel layer 808 and a basic layer 6 formed on the copper plating layer 3, in which the basic layer 6 has a Semi-bright nickel layer 62, a high sulfur nickel layer 51 and a Satin nickel layer 64, the Semi-bright nickel layer 62 is formed on the copper plating layer 3, the high sulfur nickel layer 61 is formed on the Semi-bright nickel layer 62 and the Satin nickel layer 64 is formed on the high sulfur nickel layer 61; and a functional layer 4 formed on the Satin nickel layer 64 of the basic layer 6, in which the functional layer 4 has a low potential nickel layer 141 and a microporous nickel layer 142, the low potential nickel layer 141 is a high sulfur nickel layer and a micro-crack nickel layer (wherein the high sulfur nickel layer is formed on the copper plating layer 3 and the micro-crack nickel layer is formed on the high sulfur nickel layer; or the micro-crack nickel layer is formed on the copper plating layer 3 and the high sulfur nickel layer is formed on the micro-crack nickel layer), and the microporous nickel layer 142 is formed on the low potential nickel layer 141; and a decorative layer 802 formed on the microporous nickel layer 142, in which the decorative layer is a trivalent white chromium plating layer.

Figure 9:
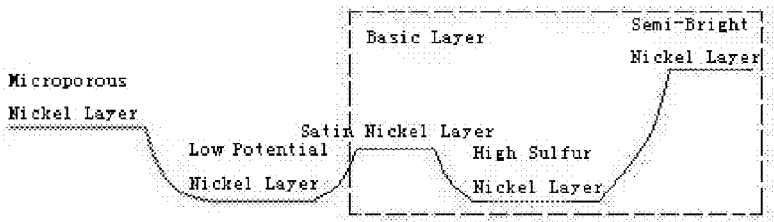
FIG. 9 is a schematic view of the potential difference of the nickel and/or chromium plated member of the invention according to one embodiment in which the low potential nickel layer is the high sulfur nickel layer or the micro-crack, nickel layer and the base layer is a complex of the Semi-bright nickel layer, the high sulfur nickel layer with the Satin nickel layer.
Figure 14:
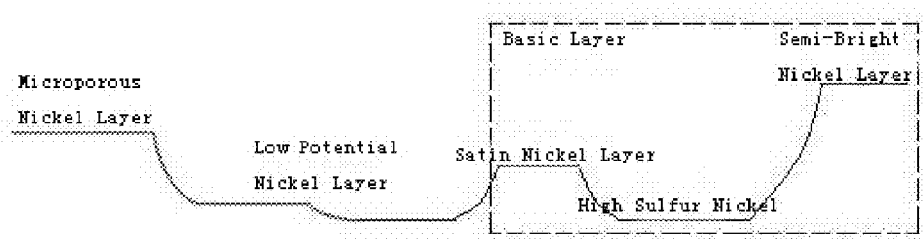
FIG. 14 is a schematic view of the potential difference of the nickel and/or chromium plated member of the invention according to one embodiment in which the low potential nickel layer is a complex layer of the high sulfur nickel layer with the micro-crack nickel layer and the base layer is a complex of the Semi-bright nickel layer, the high sulfur nickel layer with the Satin nickel layer.

It could be seen from the potential diagrams of the plating layers of FIGS. 9 and 14 that the low potential nickel layer is the sacrifice layer while being subject to corrosion no matter when the low potential nickel layer is a single layer or a composite layer in this embodiment. When the low potential nickel layer is a composite layer of the high sulfur nickel layer with the micro-crack nickel layer, the potentials of the high sulfur nickel layer and the micro-crack nickel layer will be adjusted according to actual manufacturing processes, in which the high sulfur nickel layer has a higher potential or the micro-crack nickel layer has a higher potential. The Satin nickel layer will be corroded firstly in light of the electric corrosion priority to reduce damage to the structure of the surface layer when the low potential nickel layer is completely corroded.

Structural Embodiment 5

Figure 5:
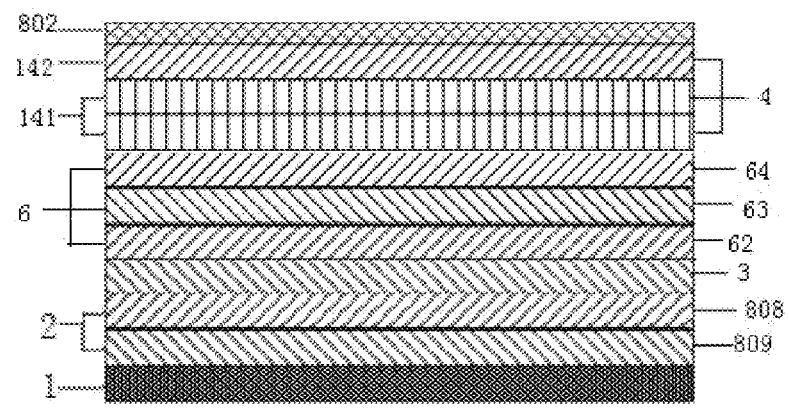
FIG. 5 is a schematic view of the structure of the nickel and/or chromium plated member of the invention according to one embodiment in which the base layer is a complex of the Semi-bright nickel layer, the bright nickel layer with the Satin nickel layer.

As shown in FIG. 5, the multi-layer super anti-corrosive nickel-chromium plated member according to this embodiment comprises a substrate 1 (ABS material); a pretreatment plating layer 2 having a chemical nickel layer 809, a base nickel layer 808 and a copper plating layer 3, in which the chemical nickel layer 809 is deposited over the whole substrate 1, the base nickel layer 808 is deposited over the chemical nickel layer 809 and the copper plating layer 3 is formed on the base nickel layer 808; and a basic layer 6 formed on the copper plating layer 3, in which the basic layer 6 has a Semi-bright nickel Slayer 62, a bright nickel layer 63 and a Satin nickel layer 64, the Semi-bright nickel layer 62 is formed on the copper plating layer 3, the bright nickel layer 63 is formed on the Semi-bright nickel layer 62 and the Satin nickel layer 64 is formed on the bright nickel layer 63; and a functional layer 4 formed on the Satin nickel layer 64 of the basic layer 6, in which the functional layer 4 has a low potential nickel layer 141 and a microporous nickel layer 142, the low potential nickel layer 141 is a high sulfur nickel layer and a micro-crack nickel layer (wherein the high sulfur nickel layer is formed on the copper plating layer 3 and the micro-crack nickel layer is formed on the high sulfur nickel layer; or the micro-crack nickel layer is formed on the copper plating layer 3 and the high sulfur nickel layer is formed on the micro-crack nickel layer), and the microporous nickel layer 142 is formed on the low potential nickel layer 141; and a decorative layer 802 formed on the microporous nickel layer 142, in which the decorative layer is a trivalent white chromium plating layer.

Figure 10:
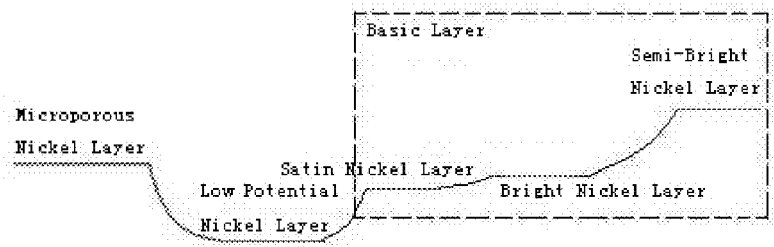
FIG. 10 is a schematic view of the potential difference of the nickel and/or chromium plated member of the invention according to one embodiment in which the low potential nickel layer is the high sulfur nickel layer or the micro-crack nickel layer and the base layer is a complex of the Semi-bright nickel layer, the bright nickel layer with the Satin nickel layer.
Figure 15:
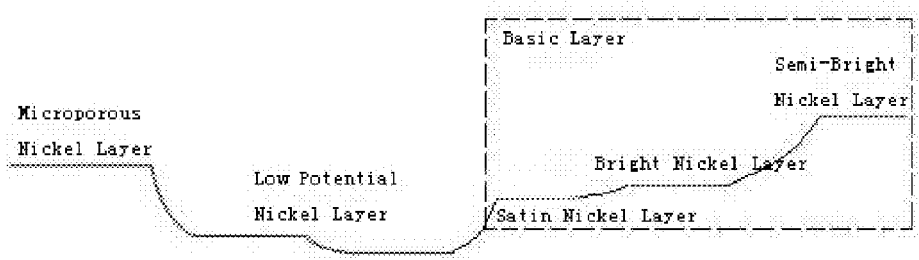
FIG. 15 is a schematic view of the potential difference of the nickel and/or chromium plated member of the invention according to one embodiment in which the low potential nickel layer is a complex layer of the high sulfur nickel layer with the micro-crack nickel layer and the base layer is a complex of the Semi-bright nickel layer, the bright nickel layer with the Satin nickel layer.

It could be seen from the potential diagrams of the plating layers of FIGS. 10 and 15 that the low potential nickel layer is the sacrifice layer while being subject to corrosion no matter when the low potential nickel layer is a single layer or a composite layer in this embodiment. When the low potential nickel layer is a composite layer of the high sulfur nickel layer with the micro-crack nickel layer, the potentials of the high sulfur nickel layer and the micro-crack nickel layer will be adjusted according to actual manufacturing processes, in which the high sulfur nickel layer has a higher potential or the micro-crack nickel layer has a higher potential. The Satin nickel layer or bright nickel layer will be corroded firstly in light of the electric corrosion priority to reduce damage to the structure of the surface layer when the low potential nickel layer is completely corroded.

The mere difference between structural embodiments 6-10 and the structural embodiments 1-5 lies in that the low potential chromium layer 141 is a micro-crack nickel layer.

The mere difference between structural embodiments 11-15 and the structural embodiments 1-5 lies in that the low potential chromium layer 141 is a high sulfur nickel layer.

The mere difference between structural embodiments 16-30 and the structural embodiments 1-15 lies in that the decorative layer 802 is a hexavalent chromium plating layer.

The mere difference between structural embodiments 31-45 and the structural embodiments 1-15 lies in that the decorative layer 802 is a trivalent black chromium plating layer.

The mere difference between structural embodiments 46-90 and the structural embodiments 1-45 lies in that the pretreatment plating layer 2 has a base nickel layer 808 and a copper plating layer 3, the base nickel layer 808 is deposited over the whole substrate 1 and the copper plating layer 3 is formed on the base nickel layer 808.

The mere difference between structural embodiments 91-135 and the structural embodiments 1-45 lies in that the pretreatment plating layer 2 has a chemical nickel layer 809 and a copper plating layer 3, the chemical nickel layer 809 is deposited over the whole substrate 1 and the copper plating layer 3 is formed on the chemical nickel layer 809.

The mere difference between structural embodiments 136-180 and the structural embodiments 1-45 lies in that no pretreatment plating layer 2 is existing and the copper plating layer 3 is formed on the substrate 1 directly.

The mere difference between structural embodiments 181-360 and the structural embodiments 1-180 lies in that the substrate 1 is pp material.

The mere difference between structural embodiments 361-540 and the structural embodiments 1-180 lies in that the substrate 1 is nylon material.

The mere difference between structural embodiments 541-720 and the structural embodiments 1-180 lies in that the substrate 1 is pc material.

The mere difference between structural embodiments 721-900 and the structural embodiments 1-180 lies in that the substrate 1 is pet material.

The mere difference between structural embodiments 901-1080 and the structural embodiments 1-180 lies in that the substrate 1 is bakelite material.

The mere difference between structural embodiments 1081-1260 and the structural embodiments 1-180 lies in that the substrate is cast iron material, including but not limited to, grey cast iron, white cast iron, nodular cast iron, vermicular cast iron, malleable cast iron and alloy cast iron.

The mere difference between structural embodiments 1261-1440 and the structural embodiments 1-180 lies in that the substrate 1 is steel material including all kinds of ordinary steels and stainless steels, aluminum alloy material and magnesium alloy material.

The substrate 1 employed, in this invention could be other materials on the surface of which the copper, nickel and chromium layers could be plated.

The solvent used for solution of the embodiments of the invention is water including but not limited to distilled water, deionized water and water with low hardness unless particularly depicted. The concentration of the solvent shall be metered on basis of unit volume or mass of solution.

The substrates for the members of the following embodiments preferably employ ABS materials to illustrate the methods for preparing nickel and/or chromium plated member of the invention.

Preparing Embodiments 1-5

The nickel plated member is prepared according to an embodiment of the invention as follows. The surface of the substrate is pretreated by the following steps in sequence including surface deoiling, surface hydrophilic treatment, surface coarsening treatment, surface neutralization treatment, pre-immerse and surface activation treatment and surface dispergation treatment. The pretreated plating layer (comprising chemically deposited nickel and base nickel, and it shall be flexibly determined according to the material of the substrate and the requirements for process and product whether to reserve the pretreatment plating layer as well as composition of the pretreatment plating layer) is deposited on the whole substrate, the chemical nickel layer and base nickel layer are formed outward in sequence on the surface of the substrate, and the copper plating layer is formed on the pretreatment plating layer (out of the base nickel layer). The Semi-bright nickel layer is formed on the copper plating layer. The bright nickel layer is formed on the Semi-bright nickel layer. The low potential layer of the functional layer is formed on the copper plating layer, in which the lower potential nickel layer is the high sulfur nickel layer. The microporous nickel layer of the functional layer is formed on the high sulfur nickel layer. The decorative layer is formed on the microporous nickel layer.

The potential difference between the microporous nickel layer and the low potential nickel layer could be any of 20, 30, 40, 50, 60, 70, 80, 90 and 100 mv or any other value in the range of 20-100 mv. Different values could be selected from 20-100 mv, for example, 20, 40, 60, 80 and 100 mv, as the potential difference between the microporous nickel layer and the low potential nickel layer in each of the corresponding embodiments 1-5. The potential difference between the microporous nickel layer and the low potential nickel layer could also be the same as each other in all the embodiments.

The potential difference between the bright nickel layer and the low potential nickel layer could be any of 0, 10, 20, 30, 40, 50, 60, 70, 80, 90 and 100 mv or any other value in the range of 20-100 mv. Different values could be selected from 0-100 mv, for example, 0, 30, 60, 80 and 100 mv, as the potential difference between the bright nickel layer and the low potential nickel layer in each of the corresponding embodiments 1-5. The potential difference between the bright nickel layer and the low potential nickel layer could also be the same as each other in all the embodiments.

The potential difference between the Semi-bright nickel layer and the bright nickel layer could be any of 100, 110, 120, 130, 140, 150, 160, 170, 180, 190 and 200 mv or any other value in the range of 100-200 mv. Different values could be selected from 100-200 mv, for example, 100, 120, 150, 180 and 200 mv, as the potential difference between the Semi-bright nickel layer and the bright nickel layer in each of the corresponding embodiments 1-5. The potential difference between the Semi-bright nickel layer and the bright nickel layer could also be the same as each other in all the embodiments.

The method for electroplating nickel on the said nickel-chromium plated member comprises the following steps:

(1) Surface Deoiling—cleaning in the mixed solution of sodium hydroxide NaOH, sodium carbonate $Na_2CO_3$, sodium silicate $Na_2SiO_3$. The concentration of each component of the mix solution in each embodiment is depicted in Table 1.

TABLE 1

| Component | Embodiment | | | | |
|---|---|---|---|---|---|
| | 1 | 2 | 3 | 4 | 5 |
| NaOH (g/L) | 20 | 35 | 30 | 40 | 50 |
| $Na_2CO_3$ (g/L) | 42 | 36 | 32 | 25 | 18 |
| Surface Active Agent (g/L) | 2 | 3 | 2 | 1 | 3 |
| $Na_2SiO_3$ (g/L) | 30 | 20 | 40 | 25 | 10 |

(2) Surface Hydrophilic Process—being performed in sulphuric acid $H_2SO_4$ and surface treatment agent. In this step, the concentration of the surface treatment agent and sulphuric acid $H_2SO_4$ in each embodiment is depicted in Table 2.

TABLE 2

| Component | Embodiment | | | | |
|---|---|---|---|---|---|
| | 1 | 2 | 3 | 4 | 5 |
| $H_2SO_4$ (g/L) | 80 | 40 | 20 | 50 | 100 |
| Surface Treatment Agent(ml/L) | 1.5 | 1.0 | 2 | 1.2 | 0.5 |

(3) Surface Coarsening Treatment—being performed in the mixed solution of chromium trioxide $CrO_3$ and sulphuric acid $H_2SO_4$. In this step, the concentration of the chromium trioxide $CrO_3$ and sulphuric acid $H_2SO_4$ in each embodiment is depicted in Table 3.

TABLE 3

| Component | Embodiment | | | | |
|---|---|---|---|---|---|
| | 1 | 2 | 3 | 4 | 5 |
| $CrO_3$ (g/L) | 330 | 480 | 380 | 450 | 400 |
| $H_2SO_4$ (g/L) | 380 | 400 | 430 | 330 | 480 |

(4) Surface Neutralization Treatment—the member subject to surface coarsening treatment is put in hydrochloric acid solution for this treatment. In this step, the concentration of the hydrochloric acid solution in each embodiment is depicted in Table 4.

TABLE 4

| Component | Embodiment | | | | |
|---|---|---|---|---|---|
| | 1 | 2 | 3 | 4 | 5 |
| Hydrochloric Acid (g/L) | 30 | 100 | 80 | 60 | 50 |
| Hydrazine Hydrate (ml/L) | 60 | 30 | 15 | 20 | 50 |

(5) Surface Pre-immerse Treatment—the member subject to surface neutralization treatment is put in hydrochloric acid solution for this treatment. In this step, the concentration of the hydrochloric acid solution in each embodiment is depicted in Table 5.

TABLE 5

| Component | Embodiment | | | | |
|---|---|---|---|---|---|
| | 1 | 2 | 3 | 4 | 5 |
| Hydrochloric Acid (g/L) | 10 | 100 | 80 | 60 | 120 |

(6) Surface Activation Treatment—being performed by using colloid palladium solution. The concentration of palladium chloride $PdCl_2$ and stannous chloride $SnCl_2$ in the colloid palladium solution in each embodiment is depicted in Table 6.

TABLE 6

| Component | Embodiment | | | | |
|---|---|---|---|---|---|
| | 1 | 2 | 3 | 4 | 5 |
| $SnCl_2$ (ppm) | 40 | 30 | 20 | 60 | 50 |
| $SnCl_2$ (g/L) | 7.0 | 5.8 | 4.5 | 3.7 | 2.5 |
| Hydrochloric Acid (ml/L) | 180 | 200 | 230 | 260 | 280 |

(7) Surface Dispergation Treatment—being performed in sulphuric acid $H_2SO_4$ solution. In this step, the concentration of the sulphuric acid solution in each embodiment is depicted in Table 7.

TABLE 7

| Component | Embodiment | | | | |
|---|---|---|---|---|---|
| | 1 | 2 | 3 | 4 | 5 |
| $H_2SO_4$ (g/L) | 60 | 40 | 80 | 50 | 100 |

The aforesaid preliminary pretreatment processes for the substrate of ABS material shall also be applicable to the pretreatment processes for the substrate of other non-metal materials. When the substrate of metals is used, the subsequent plating process could be carried out immediately after the deoiling process in the surface deoiling treatment. And the specific processes are also applicable to the corresponding processes in the fundamental preliminary pretreatment processes for the substrate of non-metal materials.

(8) Chemical Nickel Deposition—being performed in the mixed solution of nickel sulphate $Ni_2SO_4\text{-}6H_2O$, sodium hypophosphite $NaH_2PO_3$—$H_2O$ with sodium citrate $C_6H_5Na_3O_7$. In this step, the concentration of different components in the mixed solution in each embodiment is depicted in Table 8.

TABLE 8

| Component | Embodiment | | | | |
|---|---|---|---|---|---|
| | 1 | 2 | 3 | 4 | 5 |
| $Ni_2SO_4$—$6H_2O$ (g/L) | 15 | 25 | 30 | 35 | 40 |
| $NaH_2PO_3$—$H_2O$ (g/L) | 50 | 40 | 30 | 20 | 35 |
| $C_6H_5Na_3O_7$ (g/L) | 43 | 39 | 34 | 28 | 22 |
| Ammonium Chloride (g/L) | 30 | 10 | 50 | 20 | 40 |
| Adjusted pH by ammonia | 8.8 | 9.0 | 8.6 | 9.2 | 8.7 |

(9) Base Nickel Planting—being performed in the mixed solution of hydrous nickel sulphate $Ni_2SO_4$-$6H_2O$, hydrous nickel chlorite $NiCl_2$-$6H_2O$ with boric acid $H_3BO_3$. In this step, the concentration of different components in the mixed solution in each embodiment is depicted in Table 9.

TABLE 9

| Component | Embodiment | | | | |
|---|---|---|---|---|---|
| | 1 | 2 | 3 | 4 | 5 |
| $Ni_2SO_4$—$6H_2O$ (g/L) | 180 | 230 | 200 | 260 | 280 |
| $NiCl_2$—$6H_2O$ (g/L) | 60 | 45 | 50 | 55 | 35 |
| Boric Acid $H_3BO_3$ (g/L) | 42 | 38 | 36 | 30 | 25 |
| Wetting Agent (ml/L) | 1 | 2 | 2 | 3 | 3 |

(10) Copper Layer Plating—being performed in the mixed solution of copper sulfate $CuSO_4$ with sulphuric acid $H_2SO_4$. In this step, the concentration of the copper sulfite $CuSO_4$ and sulphuric acid $H_2SO_4$ in the mixed solution in each embodiment is depicted in Table 10.

TABLE 10

| Component | Embodiment | | | | |
|---|---|---|---|---|---|
| | 1 | 2 | 3 | 4 | 5 |
| $CuSO_4$ (g/L) | 160 | 180 | 200 | 260 | 230 |
| $H_2SO_4$ (g/L) | 72 | 57 | 63 | 74 | 52 |
| Chloride Ion (ppm) | 100 | 80 | 40 | 60 | 70 |
| Change Agent (ml/L) | 0.5 | 0.2 | 1.0 | 0.8 | 0.6 |

(11) Semi-bright nickel Layer Plating—being performed in the mixed solution of hydrous nickel sulphate $Ni_2SO_4$-$6H_2O$, nickel chlorite $NiCl_2$-$6H_2O$ with boric acid $H_3BO_3$. In this step, the concentration of different components in the mixed solution in each embodiment is depicted in Table 11, and other parameters of the Semi-bright nickel plating process are illustrated in Table 12.

TABLE 11

| Component | Embodiment | | | | |
|---|---|---|---|---|---|
| | 1 | 2 | 3 | 4 | 5 |
| $Ni_2SO_4$—$6H_2O$ (g/L) | 200 | 300 | 280 | 230 | 250 |
| $NiCl_2$—$6H_2O$ (g/L) | 40 | 35 | 45 | 38 | 50 |
| Boric Acid $H_3BO_3$ (g/L) | 50 | 48 | 42 | 40 | 35 |
| Semi-bright nickel Primary Brightening Agent (ml/L) | 3.0 | 6.0 | 4.0 | 7.0 | 5.0 |
| Semi-bright nickel Secondary Brightening Agent (ml/L) | 1.0 | 0.8 | 0.6 | 0.3 | 0.5 |
| Potential Difference Adjusting Agent (ml/L) | 0.3 | 0.4 | 0.1 | 0.5 | 0.6 |
| Wetting Agent (ml/L) | 2.0 | 3.0 | 2.5 | 1.5 | 1.0 |

TABLE 12

| Parameter | Embodiment | | | | |
|---|---|---|---|---|---|
| | 1 | 2 | 3 | 4 | 5 |
| Temperature (° C.) | 50 | 60 | 55 | 52 | 58 |
| pH Value | 4.0 | 4.2 | 4.4 | 3.6 | 3.8 |
| Current (ASD) | 2 | 3 | 5 | 4 | 3 |
| Time (min) | 20 | 12 | 15 | 18 | 24 |
| Thickness of Semi-bright nickel Layer (μm) | 8.2 | 8 | 8.2 | 8.1 | 8.3 |

(12) Bright nickel Layer Plating—being performed in the mixed solution of hydrous nickel sulphate $Ni_2SO_4$-$6H_2O$, hydrous nickel chlorite $NiCl_2$-$6H_2O$ with boric acid $H_3BO_3$. In this step, the concentration of different components in the mixed solution in each embodiment is depicted in Table 13, and other parameters of the Semi-bright nickel plating process are illustrated in Table 14.

TABLE 13

| Component | Embodiment | | | | |
|---|---|---|---|---|---|
| | 1 | 2 | 3 | 4 | 5 |
| $Ni_2SO_4$—$6H_2O$ (g/L) | 240 | 360 | 280 | 330 | 350 |
| $NiCl_2$—$6H_2O$ (g/L) | 45 | 35 | 65 | 55 | 50 |
| Boric Acid $H_3BO_3$ (g/L) | 65 | 55 | 45 | 60 | 35 |
| Bright Nickel Softening Agent (ml/L) | 8 | 10 | 12 | 15 | 9 |
| Bright Nickel Brightening Agent A (ml/L) | 10 | 8 | 6 | 5 | 7 |
| Bright Nickel Primary Brightening Agent (ml/L) | 2.0 | 3.0 | 2.5 | 1.5 | 1.8 |
| Wetting Agent (ml/L) | 3.0 | 2.5 | 2.0 | 1.0 | 1.5 |

TABLE 14

| Parameter | Embodiment | | | | |
|---|---|---|---|---|---|
| | 1 | 2 | 3 | 4 | 5 |
| Temperature (° C.) | 50 | 60 | 55 | 52 | 58 |
| pH Value | 4.0 | 4.2 | 4.4 | 3.6 | 3.8 |
| Current (ASD) | 2 | 3 | 5 | 4 | 3 |
| Time (min) | 9 | 13 | 15 | 18 | 20 |
| Thickness of Bright nickel Layer (μm) | 5.2 | 5.3 | 5.1 | 5.0 | 5.1 |

(13) High Dulfur Nickel Layer (low potential nickel layer) and Microporous Nickel Layer Plating—In the processes for plating microporous nickel and high sulfur nickel, the electroplating liquid is the same as the mixed solution of hydrous nickel sulphate $Ni_7SO_4$-$6H_2O$, hydrous nickel chlorite $NiCl_2$-$6H_2O$ with boric acid $H_3BO_3$. The concentrations of different components in the mixed solution in each embodiment for plating high sulfur and microporous nickel are depicted in Table 15 and 17 respectively in which the nickel seal brightening agent is Enthone 63, the nickel seal primary brightening agent is Enthone 610CFC, and the nickel seal particle carrier is Enthone Enhancer; and other parameters of the processes for plating high sulfur and microporous nickel are illustrated in Table 16 and 18 respectively.

TABLE 15

| Component | Embodiment | | | | |
|---|---|---|---|---|---|
| | 1 | 2 | 3 | 4 | 5 |
| Ni$_2$SO$_4$—6H$_2$O (g/L) | 250 | 350 | 280 | 300 | 320 |
| NiCl$_2$—6H$_2$O (g/L) | 60 | 50 | 35 | 40 | 45 |
| Boric Acid H$_3$BO$_3$ (g/L) | 35 | 65 | 50 | 45 | 55 |
| High Sulfur Adding Agent (ml/L) | 8 | 6 | 10 | 3 | 5 |
| Wetting Agent (g/L) | 28 | 12.5 | 18.7 | 28 | 24 |

TABLE 16

| Parameter | Embodiment | | | | |
|---|---|---|---|---|---|
| | 1 | 2 | 3 | 4 | 5 |
| Temperature (° C.) | 62 | 60 | 55 | 58 | 65 |
| pH Value | 2.0 | 2.5 | 3.0 | 3.5 | 2.8 |
| Current (ASD) | 2 | 3 | 5 | 4 | 6 |
| Time (min) | 8 | 2 | 5 | 4 | 3 |
| Thickness of Microporous Nickel Layer (μm) | 1.5 | 1.6 | 1.7 | 1.6 | 1.5 |

TABLE 17

| Component | Embodiment | | | | |
|---|---|---|---|---|---|
| | 1 | 2 | 3 | 4 | 5 |
| Ni$_2$SO$_4$—6H$_2$O (g/L) | 300 | 310 | 320 | 340 | 350 |
| NiCl$_2$—6H$_2$O (g/L) | 55 | 50 | 57 | 60 | 53 |
| Boric Acid H$_3$BO$_3$ (g/L) | 44 | 50 | 40 | 48 | 46 |
| Nickel Seal Brightening Agent (ml/L) | 6 | 8 | 9 | 11 | 12 |
| Nickel Seal Primary Brightening Agent (ml/L) | 4 | 7.5 | 5.2 | 6.7 | 4.3 |
| Nickel Seal Particle Carrier (g/L) | 0.7 | 0.2 | 1.0 | 1.5 | 1.3 |
| Nickel Seal Particle Dispersing Agent (ml/L) | 1 | 0.5 | 3 | 1.5 | 2 |
| Wetting Agent (ml/L) | 1 | 2 | 3 | 4 | 5 |

TABLE 18

| Parameter | Embodiment | | | | |
|---|---|---|---|---|---|
| | 1 | 2 | 3 | 4 | 5 |
| Temperature (° C.) | 50 | 60 | 55 | 52 | 58 |
| pH Value | 4.0 | 4.2 | 4.4 | 3.8 | 4.6 |
| Current (ASD) | 2 | 3 | 5 | 4 | 3 |
| Time (min) | 3 | 2 | 5 | 4 | 3 |
| Thickness of Microporous Nickel Layer (μm) | 1.5 | 1.6 | 1.7 | 1.6 | 1.5 |

(14) Decorative Layer Plating—being performed in the mixed solution containing chromium chloride and potassium formate. In this step, the concentration of different components in the mixed solution in each embodiment is depicted in Table 19.

TABLE 19

| Component | Embodiment | | | | |
|---|---|---|---|---|---|
| | 1 | 2 | 3 | 4 | 5 |
| CrCl$_3$—6H$_2$O (g/L) | 130 | 110 | 90 | 150 | 100 |
| Potassium Formate (g/L) | 80 | 50 | 90 | 100 | 70 |
| Ammonium Bromide (g/L) | 8 | 25 | 20 | 15 | 12 |
| Ammonium Chloride (g/L) | 40 | 50 | 60 | 45 | 55 |
| Potassium Chloride (g/L) | 100 | 80 | 40 | 60 | 50 |
| Sodium Acetate (g/L) | 30 | 50 | 60 | 40 | 10 |
| Boric Acid (g/L) | 60 | 70 | 40 | 50 | 80 |
| Wetting Agent (ml/L) | 2.5 | 0.5 | 2.0 | 1.5 | 1.2 |

The mere difference between the preparing embodiments 6-10 and the preparing embodiments 1-5 lies in that the low potential nickel layer is a micro-crack layer and the electroplating liquid as illustrated in Table 20 is applied for plating the micro-crack nickel layer. The other parameters for the process for plating micro-crack nickel are illustrated in Table 21.

TABLE 20

| Component | Embodiment | | | | |
|---|---|---|---|---|---|
| | 6 | 7 | 8 | 9 | 10 |
| NiCl$_2$—6H$_2$O (g/L) | 180 | 240 | 260 | 200 | 220 |
| Acetic Acid (g/L) | 20 | 30 | 40 | 10 | 25 |
| PN-1A (g/L) | 50 | 40 | 90 | 60 | 70 |
| PN-2A (g/L) | 2 | 4 | 3 | 5 | 1 |
| Wetting Agent (ml/L) | 3 | 2 | 4 | 1 | 5 |

TABLE 21

| Parameter | Embodiment | | | | |
|---|---|---|---|---|---|
| | 6 | 7 | 8 | 9 | 10 |
| Temperature (° C.) | 25 | 35 | 30 | 22 | 28 |
| pH Value | 4.0 | 3.6 | 4.2 | 3.8 | 4.6 |
| Current (ASD) | 9 | 5 | 6 | 7 | 8 |
| Time (min) | 3 | 2 | 5 | 4 | 3 |
| Thickness of Micro-crack Nickel Layer (μm) | 1.5 | 1.6 | 1.7 | 1.6 | 1.5 |

The mere difference between the preparing embodiments 11-15 and the preparing embodiments 1-5 lies in that the low potential nickel layer contains a complex of the high sulfur nickel layer (the electroplating liquid for each embedment is illustrated in Table 15 in sequence correspondingly) and the micro-crack nickel layer (the electroplating liquid for each embedment is illustrated in Table 20 in sequence correspondingly). Wherein, the potential difference between the micro-crack nickel layer and the high sulfur nickel layer could be any of 10, 20, 30, 40, 50, 60, 70 and 80 mv or any other value in the range of 10-80 mv. Different values could be selected from 10-80 mv, for example, 10, 20, 40, 60 and 80 mv, as the potential difference between the micro-crack nickel layer and the high sulfur nickel layer in each of the corresponding embodiments 11-15. The potential difference between the micro-crack nickel layer and the high sulfur nickel layer could also be the same as each other in all the embodiments.

The mere difference between the preparing embodiments 16-30 and the preparing embodiments 1-15 lies in that the bright nickel layer is replaced with a Satin nickel layer and the electroplating liquid as illustrated in Table 22 is applied for plating the Satin nickel layer (a random number is used to indicate the embodiments).

TABLE 22

| Component | Embodiment | | | | |
|---|---|---|---|---|---|
| | 1 | 2 | 3 | 4 | 5 |
| $Ni_2SO_4\_6H_2O$ (g/L) | 250 | 350 | 280 | 330 | 350 |
| $NiCl_2\_6H_2O$ (g/L) | 45 | 35 | 60 | 55 | 50 |
| Boric Acid $H_3BO_3$ (g/L) | 65 | 55 | 45 | 60 | 35 |
| Auxiliary Additive (ml/L) | 12 | 10 | 20 | 15 | 5 |
| Satin Nickel Forming Agent (ml/L) | 0.2 | 0.3 | 0.6 | 0.5 | 0.4 |

The mere difference between the preparing embodiments 31-60 and the preparing embodiments 1-30 lies in that the trivalent white chromium layer in the decorative layer is replaced with trivalent black chromium layer and the electroplating liquid as illustrated in Table 23 is applied for plating the trivalent black chromium layer correspondingly (a random number is used to indicate the embodiments).

TABLE 23

| Component | Embodiment | | | | |
|---|---|---|---|---|---|
| | 1 | 2 | 3 | 4 | 5 |
| $CrCl_3\_6H_2O$ (g/L) | 150 | 200 | 180 | 250 | 220 |
| Oxalic Acid (g/L) | 2 | 3 | 4 | 5 | 3 |
| Ammonium Acetate (g/L) | 8 | 5 | 3 | 6 | 10 |
| Ammonium Chloride (g/L) | 40 | 25 | 35 | 20 | 30 |
| Boric Acid (g/L) | 20 | 41 | 30 | 35 | 25 |
| Additive Agent (ml/L) | 2.5 | 0.5 | 2.0 | 1.5 | 3.0 |

The mere difference between the preparing embodiments 61-90 and the preparing embodiments 1-30 lies in that the trivalent white chromium layer in the decorative layer is replaced with hexavalent chromium layer and the electroplating liquid as illustrated in Table 24 is applied for plating the hexavalent chromium layer correspondingly (a random number is used to indicate the embodiments).

TABLE 24

| Component | Embodiment | | | | |
|---|---|---|---|---|---|
| | 1 | 2 | 3 | 4 | 5 |
| Chromium Trioxide (g/L) | 320 | 260 | 280 | 300 | 360 |
| Sulphuric Acid (ml/L) | 0.5 | 2 | 1 | 3 | 2.5 |
| Decorative Chromium Brightening Agent (g/L) | 2.0 | 1.0 | 3.0 | 2.0 | 3.0 |
| Chromium Fog Inhibiting Agent (ml/L) | 0.2 | 0.3 | 0.3 | 0.4 | 0.4 |

In the above preparing embodiments, PN-1A and PN-2A are both products available on the market by Atotech (China) Chemicals Ltd.

In connection with all the aforesaid embodiments, it could be seen that all the embodiments could be subject to CASS test for more than 96-120 h (which is 40-48 h in the prior art) and subject to calcium chloride mud testing test for more than 336 h stably (the product obtained in the prior art is not stable and could not be measured for such a character).

The substrate employed, in the invention could be made from materials including C, PP, PVC, PET, bakelite and metallic materials. When the substrate is made of materials other than ABS, the pretreatment plating layer could be existing or not existing depending on the performance of actual materials and processing requirements.

Figure 16:
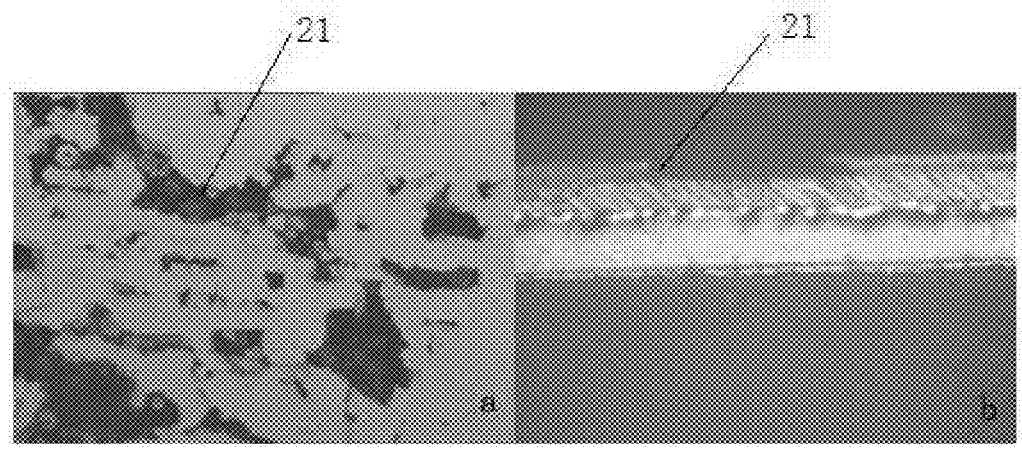
FIG. 16 is a metallograph of the nickel plated member of the prior art subject to CASS for 72 h, in which (a) indicates the front metallograph of the sample subject to the test and (b) indicates the side (sectional) metallograph of the sample subject to the test.
Figure 17:
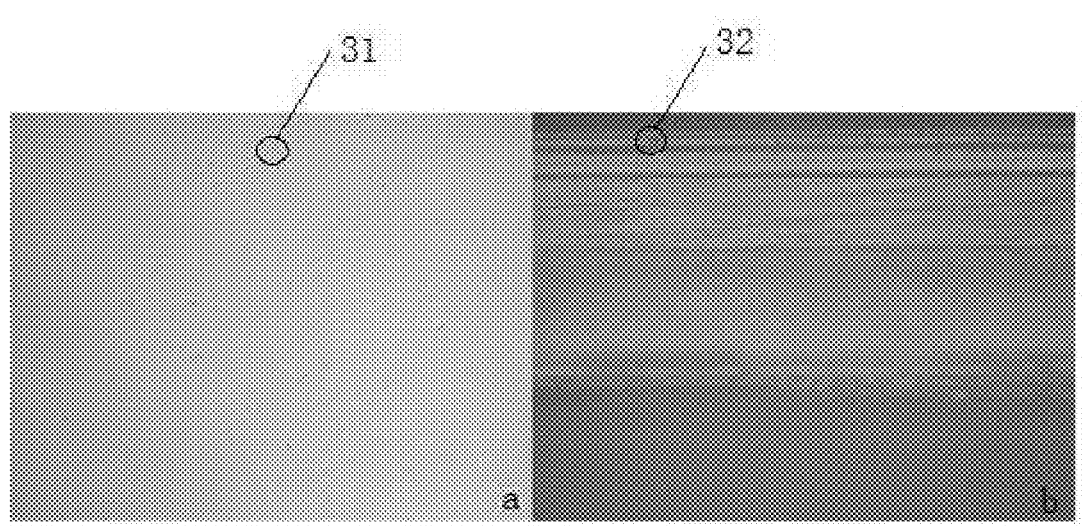
FIG. 17 is a metallograph of the nickel plated member of the invention subject to CASS for 72 h, in which (a) indicates the front metallograph of the sample subject to the test and (b) indicates the side metallograph of the sample subject to the test.

FIG. 17 indicates a corrosion state of the nickel plated member according to one embodiment of the invention subject to CASS test for 72 h. FIG. 16 indicates a corrosion state of the nickel plated member of the prior art subject to CASS test for 72 h (under the same experimental conditions). Comparing FIG. 17 with FIG. 16, it could be directly seen that the sample of the prior art has plating layers peeled off to a large extent and corrosion gaps 21 generated after corrosion, and the quality of the plating layer of the product is seriously affected. It could be viewed from FIG. 3 that the nickel plated sample of the invention has a certain number of surface micropores 31 on its surface and only small corrosion holes 32 exist in the section. Neither the surface micropores nor the corrosion holes produced in the sacrifice layer could destroy the plating layer of the member. And the use and appearance of the product will not be influenced either.

Figure 18:
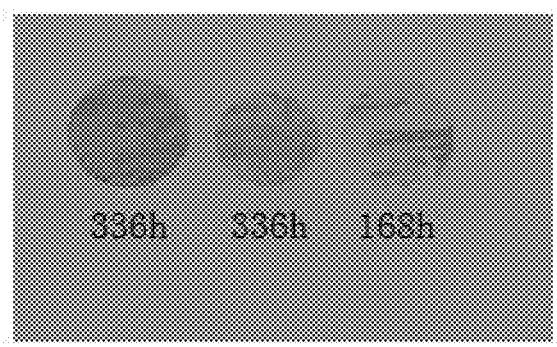
FIG. 18 is a picture of the nickel plated member of the prior art subject to calcium chloride mud testing for 168 h and 336 h.
Figure 19:
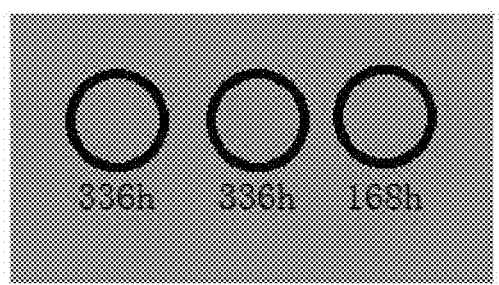
FIG. 19 is a picture of the nickel plated member of the invention subject to calcium chloride mud testing for 168 h and 336 h.

FIG. 18 and FIG. 19 respectively indicate the corrosion state of the surface of the nickel plated member sample of the prior art and that of the surface of the nickel plated member sample according to one embodiment of the invention subject to calcium chloride mud testing for 336 h, 336 h and 168 h, in which the circular parts refer to the areas subject to the test. It could be determined from the figures that the surfaces of the nickel plated member of the prior art are subject to corrosion to different degrees, and the samples of the invention are slightly corroded and no color change is involved. As such, the nickel plated member obtained by the invention has better stability and corrosion resistance for the plating layer, and the nickel plated member is more durable and has more aesthetic appearance.

Any aspects that are not exhaustively described in the embodiments of the invention are also within the scope of the invention.

The technical solutions disclosed by the invention are not limited to those disclosed in the embodiments, and shall encompass the technical solutions acquired by combination of the aforesaid elements in any manner. The specific embodiments described herein are merely illustrative of the spirit of the invention. It is apparent to those skilled in the art that various modifications and embellishments can be made to these embodiments without departing from the spirit or scope defined by the appended claims.

LIST OF REFERENCE NUMERALS

1 Substrate
2 Pretreatment Layer
21 Corrosion Gap
3 Copper Plating Layer
31 Surface Micropore
32 Corrosion Hole
4 Functional layer
141 Low Potential Nickel Layer
142 Microporous Nickel Layer
801 Corrosion Medium
802 Decorative Layer
805 Corrosion Surface
808 Base Nickel Layer
809 Chemical Nickel Layer
810 ABS substrate
6 Basic Layer
61 High Sulfur Nickel Layer
62 Semi-bright nickel Layer
63 Bright nickel Layer
64 Satin Nickel Layer

What is claimed is:
1. A nickel-chromium plated member, comprising:
a substrate;

a pretreatment plating layer deposited over the whole substrate, on which a copper plating layer is formed; and a basic layer formed on the copper plating layer, the basic layer is a complex of a Semi-bright nickel layer, a bright nickel layer with a Satin nickel layer, in which the Semi-bright nickel layer is formed on the copper plating layer, the bright nickel layer is formed on the Semi-bright nickel layer and the Satin nickel layer is formed on the bright nickel layer; potential difference between the Semi-bright nickel layer and the bright nickel layer and potential difference between the Semi-bright nickel layer and the Satin nickel layer are both in the range of 100-200 mv, the potential of the bright nickel layer and the Satin nickel layer are lower than the potential of the Semi-bright nickel layer; and a functional layer formed on the basic layer, in which the functional layer has a low potential nickel layer and a microporous nickel layer formed on the low potential nickel layer; the low potential nickel layer employs the complex plating layer of a micro-crack nickel layer with a high sulfur nickel layer, a potential difference between the micro-crack nickel layer and the high sulfur nickel layer is 10-80 mv; and a decorative layer formed on the microporous nickel layer, in which the decorative layer is a trivalent chromium plating layer or a hexavalent chromium plating layer;

potential difference between the microporous nickel layer and the low potential nickel layer is in the range of 10-120 mv; and thickness of the microporous nickel layer is no less than 1.5 μm, thickness of the high sulfur nickel layer is no less than 1.0 μm, thickness of the Semi-bright nickel plating layer is no less than 8 μm, and thickness of the bright nickel plating layer is no less than 5 μm.

2. A method for manufacturing a nickel-chromium plated member, comprising:

pretreating a surface of a substrate;

depositing a pretreatment plating layer over the whole substrate and forming a copper plating layer on the pretreatment plating layer; and forming a basic layer on the copper plating layer, the basic layer is a complex of the Semi-bright nickel layer, the bright nickel layer with the Satin nickel layer, in which the Semi-bright nickel layer is formed on the copper plating layer, the bright nickel layer is formed on the Semi-bright nickel layer and the Satin nickel layer is formed on the bright nickel layer; and forming a functional layer on the basic layer, the functional layer is a complex of a low potential nickel layer with a microporous nickel layer, in which the low potential nickel layer is formed on the Satin nickel layer, the microporous nickel layer is formed on the low potential nickel layer, the low potential nickel layer employs the complex plating layer of the micro-crack nickel layer with the high sulfur nickel layer, the potential difference between the micro-crack nickel layer and the high sulfur nickel layer is 10-80 mv; and the potential difference between the microporous nickel layer and the low potential nickel layer is 10-120 mv; and forming a decorative layer on the functional layer.

3. The nickel-chromium plated member as claimed in claim 1, characterized in that, the potential difference between the microporous nickel layer and the low potential nickel layer is in the range of 20-100 mv.

* * * * *